United States Patent
Gan et al.

(10) Patent No.: US 6,790,561 B2
(45) Date of Patent: Sep. 14, 2004

(54) PROCESS FOR FABRICATING CONTINUOUSLY COATED ELECTRODES ON A POROUS CURRENT COLLECTOR AND CELL DESIGNS INCORPORATING SAID ELECTRODES

(75) Inventors: Hong Gan, East Amherst, NY (US); Esther S. Takeuchi, East Amherst, NY (US); Robert S. Rubino, Williamsville, NY (US)

(73) Assignee: Wilson Greatbatch Ltd., Clarence, NY (US)

( * ) Notice: Subject to any disclaimer, the term of this patent is extended or adjusted under 35 U.S.C. 154(b) by 262 days.

(21) Appl. No.: 10/096,040

(22) Filed: Mar. 12, 2002

(65) Prior Publication Data

US 2002/0132167 A1 Sep. 19, 2002

Related U.S. Application Data

(60) Provisional application No. 60/276,098, filed on Mar. 15, 2001.

(51) Int. Cl.$^7$ .............................. H01M 4/70; H01M 4/04
(52) U.S. Cl. ........................ 429/241; 429/243; 429/244; 29/623.5
(58) Field of Search ................................ 429/241, 243, 429/244; 29/623.1, 623.5

(56) References Cited

U.S. PATENT DOCUMENTS

| | | | |
|---|---|---|---|
| 4,313,259 A | * | 2/1982 | Kaun et al. ............. 29/623.5 X |
| 5,501,744 A | | 3/1996 | Albright et al. |
| 5,578,398 A | * | 11/1996 | Jenkins et al. .......... 429/241 X |
| 5,578,502 A | | 11/1996 | Albright et al. |
| 5,702,845 A | | 12/1997 | Kawakami et al. |
| 5,744,258 A | | 4/1998 | Bai et al. |
| 5,804,335 A | | 9/1998 | Kamauchi et al. |
| 5,849,430 A | * | 12/1998 | Lee ......................... 429/241 X |
| 5,922,493 A | | 7/1999 | Humphrey, Jr. et al. |
| 5,935,724 A | | 8/1999 | Spillman et al. |
| 5,989,745 A | | 11/1999 | Kamauchi et al. |
| 6,001,507 A | | 12/1999 | Ono et al. |
| 6,096,455 A | * | 8/2000 | Satake et al. ................ 429/241 |
| 6,110,622 A | | 8/2000 | Frysz et al. |
| 6,153,077 A | | 11/2000 | Kato et al. |
| 6,187,473 B1 | * | 2/2001 | Tamezane et al. ....... 429/241 X |
| 6,436,580 B1 | * | 8/2002 | Sugikawa ............... 429/241 X |
| 6,489,058 B1 | * | 12/2002 | Weckesser et al. ...... 429/241 X |
| 2003/0198868 A1 | * | 10/2003 | Takeuchi et al. ............ 429/217 |

* cited by examiner

*Primary Examiner*—Stephen J. Kalafut
(74) *Attorney, Agent, or Firm*—Michael J. Scalise

(57) ABSTRACT

The invention is directed to an electrochemical cell having at least one of its electrodes produced by coating a slurry mixture of an active material, possibly a conductive additive, and a binder dispersed in a solvent and contacted to a perforated current collector foil. It is particularly important that the active slurry does not move through the perforations of the current collector. For this reason, a barrier is placed against the opposite side of the current collector to block the perforations as the current collector is being coated with the slurry. After volatilizing the solvent, a second, different active material is coated to the opposite side of the current collector, either as a slurry, a pressed powder, a pellet or a free standing sheet. An example of this is a cathode having a configuration of: SVO/current collector CF$_x$. The opposed active materials on the current collector can also be of the same chemistry.

49 Claims, 4 Drawing Sheets

US 6,790,561 B2

PROCESS FOR FABRICATING CONTINUOUSLY COATED ELECTRODES ON A POROUS CURRENT COLLECTOR AND CELL DESIGNS INCORPORATING SAID ELECTRODES

CROSS REFERENCE TO RELATED APPLICATION

The present application claims priority from provisional application Serial No. 60/276,098, filed Mar. 15, 2001.

BACKGROUND OF THE INVENTION

1. Field of the Invention

The present invention generally relates to the conversion of chemical energy to electrical energy. More particularly, the present invention is directed to an electrochemical cell in which the current collector for at least one of the electrodes is of a metal foil containing openings or perforations that provide for ion migration from one side of the foil to the other. The openings may comprise 2% to 80% of the current collector surface area.

The perforated conductive foil is particularly useful for fabricating electrodes, whether of a positive or negative polarity for a primary or a secondary cell, from an electrode active material slurry. The active slurry is continuously coated onto one side of the current collector by applying a barrier to the opposite side of the foil. The barrier allows the slurry to fill the openings on the side being coated while simultaneously preventing migration of the active material to the opposite side thereof. Alternatively, no barrier is needed if the slurry viscosity is increased so that it does not pass through the openings before the electrode is dried.

Electrodes prepared in this manner are useful with only one side of the perforated current collector being slurry coated or, the second side of the current collector is slurry coated with the same or a different material than that supported on the first side. Such electrodes are particularly useful in a jellyroll type electrode assembly. It is also within the scope of the present invention to apply an electrode active material, being either the same or different than that on the first side of the current collector, to the second side by a pressing process.

2. Prior Art

An electrochemical cell typically contains current collectors that aid in the distribution of electrons to and from the counter electrode active materials. In conventional cells, a metal screen is used for this purpose. The problem is that it is difficult to continuously coat an electrode active material to a current collector screen. Therefore, each screen must be processed individually. This is labor-intensive, particularly if the cell being produced requires substantial electrode surface area.

For producing relatively large electrode volumes, it is more desirable to continuously coat active material onto the current collector. Such coating processes require a foil-type current collector. In some cases, however, it is also desirable to provide a means for ion migration from one side of the current collector to the other.

An example of an electrode where ion migration is important is described in U.S. Pat. No. 6,551,747 to Gan, which is assigned to the assignee of the present invention and incorporated herein by reference. This patent describes a lithium cell having a cathode of silver vanadium oxide (SVO) and fluorinated carbon ($CF_x$) contacted to the opposite sides of the cathode current collector. During discharge, the SVO provides high current for pulse discharge applications while the $CF_x$ serves to re-charge the SVO once the load has been removed. Supporting the SVO and $CF_x$ on opposite sides of a perforated current collector facilitates this discharge interaction.

SUMMARY OF THE INVENTION

One aspect of this invention is, therefore, to coat an electrode active material onto a perforated foil containing a substantial area of openings or perforations through which ions may pass during cell discharge. The perforated foil serving as a current collector has from about 2% to about 80% open area and the electrode active coating is in the form of a slurry or paste contacted thereto. During the coating process, the open areas or perforations are blocked by applying a barrier to the opposite side of the foil. The barrier prevents the slurry from moving or leaking through the current collector openings and remains in place until the drying process is complete. An exemplary barrier is another foil devoid of openings. A second method of coating involves preparing a paste having a sufficiently high viscosity such that it cannot pass through the foil openings prior to drying.

Another aspect of the present invention involves pressure contacting a second, different electrode active material to the other side of the current collector after the first coating is complete. In this manner, two or more electrode active materials having different strengths and weaknesses share both ions and electrons during cell discharge. For example, a first active material having a relatively high capacity but a relatively low rate capability is contacted to one side of the perforated current collector foil, preferably as a coated slurry, and a second active material having a relatively low capacity but a relatively high rate capability is contacted to the other side. An example of this is a cathode having the configuration of: SVO/current collector/$CF_x$. In such a construction, the high rate SVO material provides current for certain applications while the high capacity $CF_x$ material essentially re-charges the high rate material between loads.

A specific example of constructing an electrode having two active materials involves providing a cathode by first coating silver vanadium oxide onto the perforated current collector foil. The uncoated side of the current collector is then pressure contacted with $CF_x$ powder. If desired, a second assembly comprising a perforated current collector foil/SVO is positioned against the opposite side of the $CF_x$ to provide a three-layer "sandwich" electrode with two intermediate current collectors. A schematic representation of this electrode construction has the following configuration: SVO/current collector/$CF_x$/current collector/SVO. The outer SVO layers provide the current needed for high current applications while the $CF_x$ provides for higher capacity than SVO alone. Alternatively, the $CF_x$ material is the first active material coated and the SVO material is contacted to the current collector by some other means, such as by mechanical pressure.

In a still further embodiment of the present invention, both the first and second electrode active materials are slurry coated to the opposite sides of the perforated current collector. For example, in the case of a cathode comprising SVO and $CF_x$, both active materials are provided in a slurry form and coated one after the other to the opposite sides of the perforated current collector. Which of them is coated first is not necessarily important.

When combined with a lithium anode, a cathode electrode having two different active materials, such as of the exemplary SVO and $CF_x$, is particularly well suited for use in an implantable cardioverter defibrillator.

These and other aspects of the present invention will become increasingly more apparent to those of ordinary skill in the art by reference to the following description taken in conjunction with the accompanying drawings.

DETAILED DESCRIPTION OF THE PREFERRED EMBODIMENTS

As used herein, the term "foil" means a relatively thin sheet metal having a thickness of about 0.0001 inches to about 0.01 inches. The foil begins as an un-perforated sheet, devoid of openings. Then, the foil is subjected to a mechanical punching operation, such as of the type described in U.S. Pat. No. 5,578,398 to Jenkins et al., the disclosure of which is incorporated herein by reference. The open area of the perforations are about 2% to about 80% of the total area of the foil.

The present invention is directed to the fabrication of electrodes for use in both primary and secondary electrochemical cells. For that purpose, an electrode active material is intimately combined in a slurry with a binder material and, if desired, a conductive diluent to promote conductivity. The slurry is provided by dissolving or dispersing the electrode active material, conductive diluent and binder in a solvent. Suitable solvents include water, methyl ethyl ketone, cyclohexanone, isophoron, N-methyl-2-pyrrolidone (NMP), N,N-dimethylformamide, N,N-dimethylacetamide, toluene, and mixtures thereof.

A suitable binder material is preferably a thermoplastic polymeric material. The term thermoplastic polymeric material is used in its broad sense and any polymeric material which is inert in the cell and which passes through a thermoplastic state, whether or not it finally sets or cures, is included within the term "thermoplastic polymer". Representative binder materials include polyethylene, polypropylene, polyimide, and fluoropolymers such as fluorinated ethylene, fluorinated propylene, polyvinylidene fluoride (PVDF), and polytetrafluoroethylene (PTFE). Natural rubbers are also useful as the binder material with the present invention.

Suitable conductive diluents include acetylene black, carbon black and/or graphite. Metals such as nickel, aluminum, titanium and stainless steel in powder form are also useful as conductive diluents.

A typical electrode for a nonaqueous, lithium electrochemical cell or a lithium ion cell is made from a mixture of 80 to 95 weight percent of an electrode active material, 1 to 10 weight percent of a conductive diluent and 3 to 25 weight percent of a polymeric binder. Less than 3 weight percent of the binder provides insufficient cohesiveness to the loosely agglomerated electrode active materials to prevent delamination, sloughing and cracking during electrode preparation and cell fabrication and during cell discharge. More than 25 weight percent of the binder provides a cell with diminished capacity and reduced current density due to lowered electrode active density.

Figure 1:
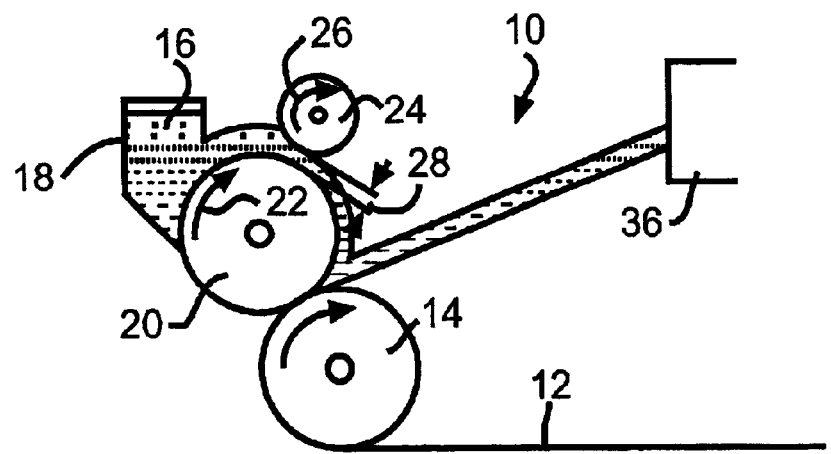
FIG. 1 is a schematic of an electrode active slurry being roll coated onto a current collector according to the present invention.

Referring now to the drawings, FIG. 1 is a schematic of an assembly 10 according to one preferred method for coating an electrode active slurry onto a current collector 12. The current collector 12 is of titanium, aluminum, nickel, stainless steel, cobalt, or copper, and alloys thereof, in the form of a foil provided in bulk rounding an unwind roller 14. The current collector 12 is perforated to have between about 2% to about 80% open area and is provided with a backing layer (not shown) already in place as it unrolls. An expanded screen or grid is also useful with the coating apparatus 10.

The active slurry 16 is contained in a weep tray 18 provided in fluid flow communication with an application roller 20 rotating in a clockwise direction, as indicated by arrow 22. The application roller rotates in conjunction with a metering roller 24, also rotating in a clockwise direction as indicated by arrow 26, to regulate the thickness of the slurry laid down onto the unwinding current collector 12. The metering roller 24 is spaced from the application roller 20 by a gap, indicated by arrows 28, set at the desired thickness of the active coating on the current collector 12. This gap is adjustable. The electrode active coating preferably has a thickness in the range of from about 0.001 inches to about 0.05 inches coated to one side of the perforated current collector 12.

Figure 2:
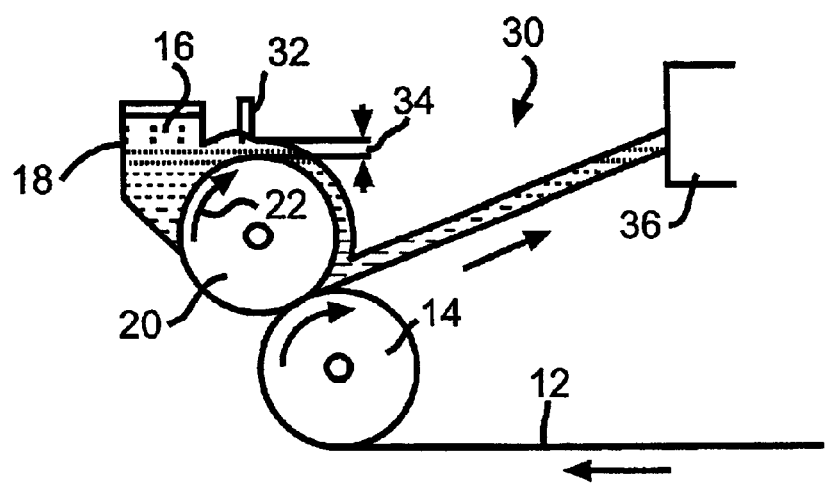
FIG. 2 is a schematic of an electrode active slurry being coated onto a current collector using a doctor blade according to the present invention.

FIG. 2 shows another preferred assembly 30 for coating an active slurry onto the perforated current collector 12 rounding the unwind roller 14. This method is similar to that shown in FIG. 1 except that the thickness of the active slurry 16 laid down on the unwinding current collector is accomplished in a different manner. Instead of a metering roller, a doctor blade 32 is used. The doctor blade 32 is spaced from the application roller 20 by a gap, indicated by arrows 34, set at the desired thickness of the active slurry coating on the current collector 12. This gap between the doctor blade 32 and the application roller 12 is adjustable to provide the electrode active coating preferably having a thickness in the range of from about 0.001 inches to about 0.05 inches coated to one side of the perforated current collector 12. As described in FIG. 1, the active coating is confined to one side of the current collector by a backing layer (not shown) already in place before the slurry is contacted thereto.

Another embodiment of the present invention for coating the active slurry 16 on the current collector 12 is termed a "knife over roll" technique. This technique is similar to that shown in FIG. 2, but does not include the current collector 12 rounding an unwind roller separate from the application roller. Instead, the current collector unfurls from an unwind roller (not shown) spaced from the doctor blade by a gap directly related to the intended thickness of the slurry coating on the current collector. The knife over roll technique eliminates the unwind roller 14 from the assembly of FIG. 2.

Whether the electrode is for use in a primary or a secondary cell chemistry, before incorporation into the cell, the active slurry coated current collector is preferably heated in an oven 36 (FIGS. 1 and 2). This occurs at a temperature of about 50° C. to about 360° C. for a period of about 30 seconds to about 5 hours and serves to drive off or evaporate the volatile solvent compounds from the electrode active admixture. Current collectors of copper must be heated under an argon atmosphere to prevent oxidation of the current collector.

If desired, the active coating is layered on both sides of a perforated current collector with an intermediate curing step. This serves to lock the active materials together through the perforations. The final dimensional thickness of the electrode laminate is in the range of about 0.003 inches to about 0.1 inches.

An electrochemical cell constructed according to the present invention, whether of a primary or a secondary chemistry, includes an anode active material selected from Groups IA, IIA, or IIIB of the Periodic Table of Elements, including lithium, sodium, potassium, etc., and their alloys and intermetallic compounds including, for example Li—Si, Li—B, Li—Mg, and Li—Si—B alloys and intermetallic compounds. The preferred anode active material comprises lithium. For a primary cell, the preferred anode comprises a lithium alloy, the preferred lithium alloy being a lithium-aluminum alloy. The greater the amount of aluminum present by weight in the alloy, however, the lower the energy density of the cell.

In secondary electrochemical systems, a carbonaceous negative electrode is preferred. The carbon comprises any of its various forms (e.g., coke, graphite, acetylene black, carbon black, etc.) which are capable of reversibly retaining the lithium species. Graphite is preferred due to its relatively high lithium-retention capacity. Carbon fibers are particularly advantageous because they have excellent mechanical properties which permit them to be fabricated into rigid electrodes that are capable of withstanding degradation during repeated charge-discharge cycling. Moreover, their high surface area allows rapid charge/discharge rates. According to the present invention, the carbon is contacted to a conductive substrate as a slurry or by pressing a powder, pellet or free standing sheet to the current collector. U.S. Pat. No. 5,571,640 to Takeuchi et al. describes a process for providing a free standing sheet of active material for later contact to a current collector. A preferred carbonaceous material for the negative electrode of a secondary electrochemical cell is described in U.S. Pat. No. 5,443,928 to Takeuchi et al. Both of these patents are assigned to the assignee of the present invention and incorporated herein by reference.

A typical secondary cell negative electrode is fabricated by mixing about 90 to 97 weight percent graphite with about 3 to 10 weight percent of a binder dispersed in one of the previously described solvents. This electrode active admixture as a viscous slurry is coated onto a current collector such as a titanium, aluminum, nickel, stainless steel, cobalt, or copper foil or screen according to the prior described FIG. 1 or 2.

The form of the anode or negative electrode may vary. For example, in a primary cell the anode is preferably a thin metal sheet or foil of the anode metal, pressed or rolled on a metallic anode current collector, i.e., preferably comprising nickel. The anode component further has an extended tab or lead of the same material as the anode current collector, i.e., preferably nickel, integrally formed therewith such as by welding and contacted by a weld to a cell case of conductive metal in a case-negative electrical configuration. Alternatively, the anode may be formed in some other geometry, such as a bobbin shape, cylinder or pellet to allow an alternate low surface cell design.

The cathode or positive electrode of both a primary and a secondary cell is preferably of a solid, lithium retention material and the electrochemical reaction at the cathode involves conversion of ions which migrate from the anode to the cathode in atomic or molecular forms. The solid cathode material may comprise a metal, a metal oxide, a mixed metal oxide, a metal sulfide or a carbonaceous compound, and combinations thereof.

One preferred mixed metal oxide useful as the cathode of a primary cell has the general formula $SM_xV_2O_y$ wherein SM is a metal selected from Groups IB to VIIB and VIII of the Periodic Table of Elements, and wherein x is about 0.30 to 2.0 and y is about 4.5 to 6.0 in the general formula. For a more detailed description of such a cathode active material, reference is made to U.S. Pat. No. 4,310,609 to Liang et al., which is assigned to the assignee of the present invention and incorporated herein by reference.

Another preferred composite cathode active material for primary cells has the general formula $Cu_xAg_yV_2O_z$, (CSVO) and the range of material compositions is preferably about $0.01 \leq x \leq 1.0$, about $0.01 \leq y \leq 1.0$ and about $5.01 \leq z \leq 6.5$. For a more detailed description of this cathode active material, reference is made to U.S. Pat. Nos. 5,472,810 and 5,516,340 to Takeuchi et al., both of which are assigned to the assignee of the present invention and incorporated herein by reference. For a silver vanadium oxide or copper silver vanadium oxide cathode, the current collector is preferably of aluminum or titanium, the latter being preferred.

One preferred electrochemical couple is of a lithium/silver vanadium oxide chemistry. In that case, the cathode is formed by adding PVDF to a polyamic acid/solvent slurry. This slurry is stirred to create a low viscosity mixture. Separately, dry SVO is milled with conductive additives to create a homogeneous mixture which is then mixed with the diluted binder slurry causing uniform coating of the SVO with the binder materials. Preferably, the active mixture is coated to a conductive current collector prior to heat curing to convert the polyamic acid to a polyimide. The product polyimide is insoluble in nonaqueous solvents typically used as activating electrolytes for alkali metal and alkali metal ion-containing cells.

The preferred binder composition for a SVO slurry ranges from, by weight, about 20% PVDF:80% PI to about 80% PVDF:20% PI with a more preferred composition ranging from about 40% PVDF:60% PI to about 60% PVDF:40% PI, and most preferably about 50% PVDF to 50% PI. Less than 20% by weight of PVDF results in insufficient cohesion of the electrode active material during electrode fabrication and cell assembly, and during charge/discharge cycling. The PVDF binder is preferably used in a powdered form while the polyamic acid is typically provided in a solvent slurry.

Other cathode active materials useful for fabrication of primary cells include manganese dioxide, copper vanadium oxide, titanium disulfide, copper oxide, copper sulfide, iron sulfide, iron disulfide, fluorinated carbon, and mixtures thereof.

Additionally, a primary electrochemical cell comprises a liquid depolarizer/catholyte, such as sulfur dioxide or oxyhalides including phosphoryl chloride, thionyl chloride and sulfuryl chloride used individually or in combination with each other or in combination with halogens and interhalogens, such as bromine trifluoride, or other electrochemical promoters or stabilizers. This type of cell requires a carbonaceous cathode current collector containing a binder.

In secondary cells, the cathode or positive electrode preferably comprises a lithiated material that is stable in air and readily handled. Examples of such air-stable lithiated materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCo_{0.92}Sn_{0.08}O_2$ and $LiCo_{1-x}Ni_xO_2$.

To discharge such secondary cells, lithium ions comprising the positive electrode are intercalated into the carbonaceous negative electrode by applying an externally generated electrical potential to recharge the cell. The applied recharging electrical potential serves to draw lithium ions from the cathode active material, through the electrolyte and into the carbonaceous anode material comprising the negative electrode. The cell is then provided with an electrical potential and discharged in a normal manner.

An alternate secondary cell construction comprises intercalating the carbonaceous material with lithium before the anode is incorporated into the cell. In this case, the cathode body can be solid and comprise, but not be limited to, such materials as manganese dioxide, silver vanadium oxide, titanium disulfide, copper oxide, copper sulfide, iron sulfide, iron disulfide and fluorinated carbon. This approach is compromised by problems associated with handling lithiated carbon outside of the cell. Lithiated carbon tends to react with explosive results when contacted by air.

Whether the cell is constructed as a primary or a secondary electrochemical system, a separator is provided to physically segregate the anode and cathode active electrodes. The separator is of electrically insulative material, and the separator material also is chemically unreactive with the anode and cathode active materials and both chemically unreactive with and insoluble in the electrolyte. In addition, the separator material has a degree of porosity sufficient to allow flow there through of the electrolyte during the electrochemical reaction of the cell. The form of the separator typically is a sheet which is placed between the anode and cathode electrodes. Such is the case when the anode is folded in a serpentine-like structure with a plurality of cathode plates disposed intermediate the anode folds and received in a cell casing or when the electrode combination is rolled or otherwise formed into a cylindrical "jellyroll" configuration. Illustrative separator materials include fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, a polytetrafluoroethylene membrane commercially available under the designation ZITEX (Chemplast Inc.), a polypropylene membrane commercially available under the designation CELGARD (Celanese Plastic Company, Inc.) and a membrane commercially available under the designation DEXIGLAS (C. H. Dexter, Div., Dexter Corp.).

Figure 3:
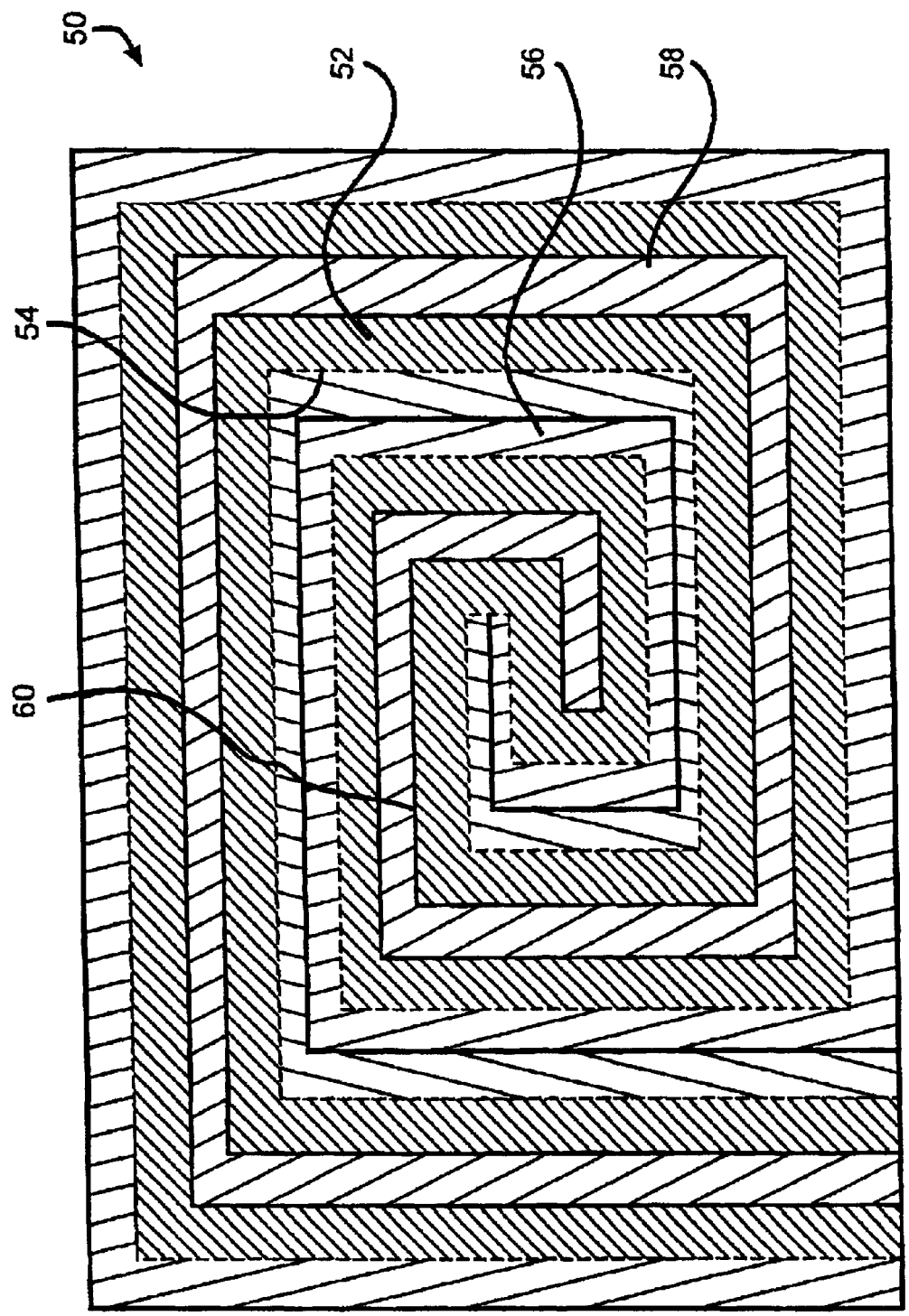
FIG. 3 is a schematic of one embodiment of an electrode assembly 50 according to the present invention.
Figure 4:
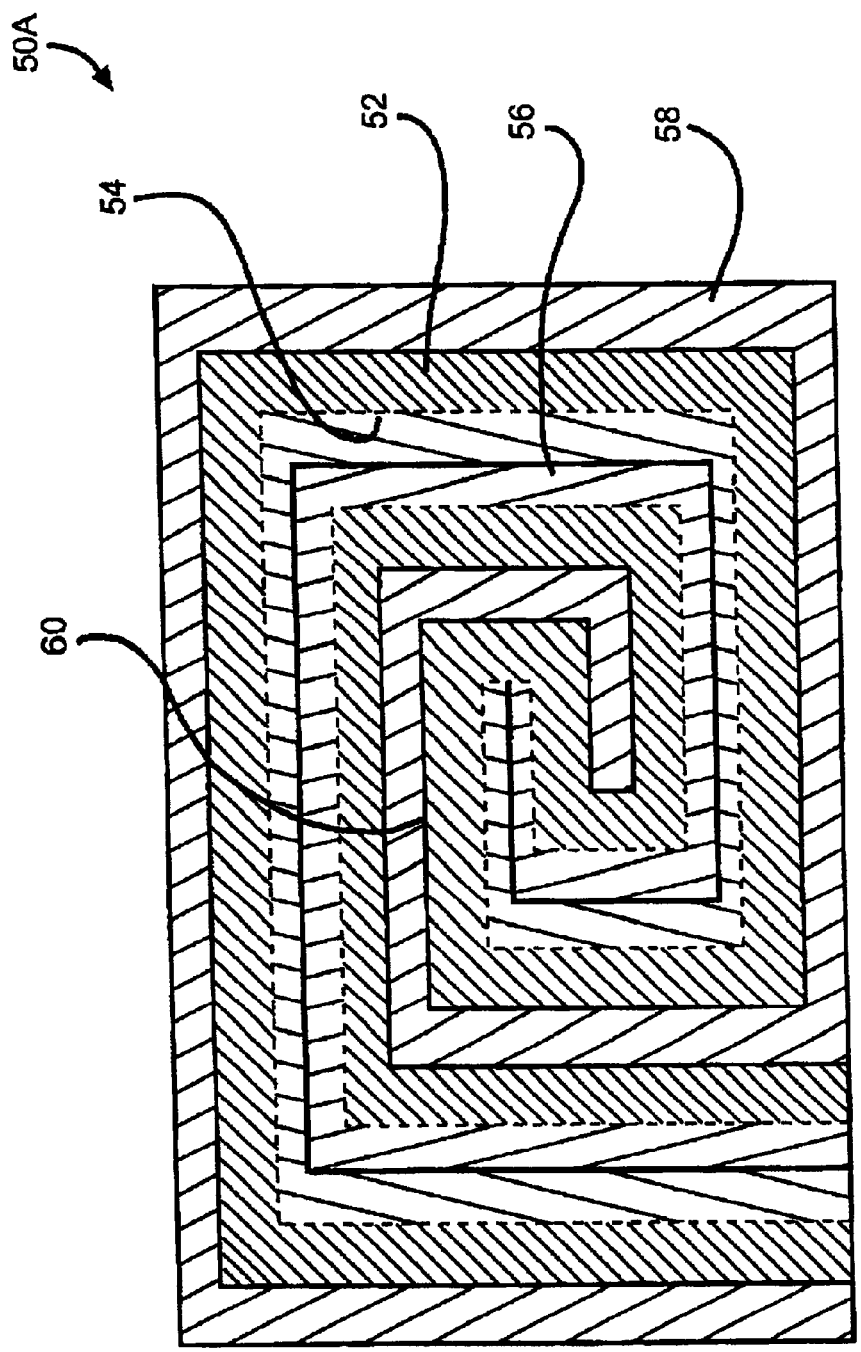
FIG. 4 is a schematic of another embodiment of an electrode assembly 50A according to the present invention.

FIGS. 3 and 4 are schematic representations of electrode assemblies having at least one electrode formed of a slurry coated to a perforated current collector according to the present invention. In FIG. 3, the electrode assembly 50 includes a cathode comprising a slurry of cathode active material 52 coated to a perforated current collector 54. An exemplary active material is SVO provided in a slurry with a binder mixture of PVDF and polyamic acid. After the slurry is contacted to the perforated current collector according to the present invention, the assembly is heat cured to convert the polyamic acid to a polyimide. For a more detailed explanation of this, reference is made to application Ser. No. 10/013,287, filed Dec. 10, 2001, which is assigned to the assignee of the present invention and incorporated herein by reference.

After the electrode active mixture is heated to evaporate the volatile solvent material or heat cured in the case of converting polyamic acid to a polyimide, a second, different cathode active material 56, such as $CF_x$, is contacted to the opposite side of the perforated current collector 54. The "sandwich" cathode assembly is completed by folding the $CF_x$/current collector/SVO assembly in half with the $CF_x$ material contacting itself.

The anode comprises lithium 58 contacted to an anode current collector (not shown). The sandwich cathode is then positioned in a wind mandrel, such as one having a rectangular cross section. The mandrel is first wound one half turn. Then, a separator 60 and the anode are positioned against the outside of the SVO material. The winding process continues until the jellyroll wound electrode assembly is of the desired size and configuration. It is preferred from a capacity standpoint that the SVO material always faces the lithium anode and that the outer layer of the electrode assembly is $CF_x$. This type of cell is referred to as a case-positive design with the $CF_x$ cathode material contacting the inside of the casing (not shown).

The present electrode assembly has several benefits over the prior art. For one, compaction of an active material to an un-perforated foil tends to cause curling. This problem is significantly reduced with a perforated current collector foil. Also, in a jellyroll wind, one side of an electrode is exposed to a larger area of the opposing electrode than the other because of the disparity in the wind radii between the opposing electrodes on either of its sides. This condition creates a material imbalance between both sides of the electrode. Use of a current collector with a sufficient amount of open area allows for ion migration and perfect material balance.

Another embodiment of the present electrode assembly 50 involves coating a carbonaceous material onto a perforated copper foil. This negative electrode is electrically associated with a positive electrode containing a lithiated metal oxide, such as lithium cobalt oxide, to provide a lithium secondary cell. Two pieces of single-side coated negative electrode are placed back-to-back to effectively provide an electrode coated on both sides. The negative electrode pieces may be of different sizes in order to create some sections of a single-side coating in areas which are unopposed by the other electrode. The perforated copper foil prevents the electrodes from curling after the required compaction process and allows for optimum material balance between the two sides of the current collector. Alternatively, the electrode containing the lithiated metal oxide or both electrodes are coated onto a perforated foil.

As shown in FIG. 4, another embodiment of an electrode assembly 50A has the outer layer of the electrode assembly being the lithium anode. This type of cell is referred to as a case-negative design with the lithium anode material contacting the inside of the casing (not shown).

Suitable nonaqueous electrolytes comprise an inorganic salt dissolved in a nonaqueous solvent, and more preferably an alkali metal salt dissolved in a mixture of aprotic organic solvents comprising a low viscosity solvent including organic esters, ethers and dialkyl carbonates, and mixtures thereof, and a high permittivity solvent including cyclic carbonates, cyclic esters and cyclic amides, and mixtures thereof. Suitable nonaqueous solvents are substantially inert to the anode and cathode electrode materials. Preferred low viscosity solvents include tetrahydrofuran (THF), methyl acetate (MA), diglyme, triglyme, tetraglyme, dimethyl carbonate (DMC), diethyl carbonate (DEC), dipropyl carbonate (DPC), methyl ethyl carbonate (MEC), methyl propyl carbonate (MPC), ethyl propyl carbonate (EPC), 1,2- dimethoxyethane (DME), and mixtures thereof. Preferred high permittivity solvents include propylene carbonate (PC), ethylene carbonate (EC), butylene carbonate (BC), acetonitrile, dimethyl sulfoxide, dimethyl formamide, dimethyl acetamide, γ-butyrolactone (GBL), γ-valerolactone, N-methyl-pyrrolidinone (NMP), and mixtures thereof.

Known lithium salts that are useful as a vehicle for transport of alkali metal ions from the anode to the cathode, and back again include, $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiO_2$, $LiNO_3$, $LiO_2CCF_3$, $LiN(SO_2CF_3)_2$, $LiSCN$, $LiO_3SCF_2CF_3$, $LiC_6F_5SO_3$, $LiO_2CF_3$, $LiSO_3F$, $LiB(C_6H_5)_4$, $LiCF_3SO_3$, and mixtures thereof. Suitable salt concentrations typically range between about 0.8 to 1.5 molar.

The assembly of the cells described herein is preferably in the form of a wound element configuration. That is, the fabricated negative electrode, positive electrode and separator are wound together in a "jellyroll" type configuration or "wound element cell stack" such that the negative electrode is on the outside of the roll to make electrical contact with the cell case in a case-negative configuration. Using suitable top and bottom insulators, the wound cell stack is inserted into a metallic case of a suitable size dimension. The metallic case may comprise materials such as stainless steel, mild steel, nickel-plated mild steel, titanium, tantalum or aluminum, but not limited thereto, so long as the metallic material is compatible for use with the other cell components.

The cell header comprises a metallic disc-shaped body with a first hole to accommodate a glass-to-metal seal/terminal pin feedthrough and a second hole for electrolyte filling. The glass used is of a corrosion resistant type having up to about 50% by weight silicon such as CABAL 12, TA 23, FUSITE 425 or FUSITE 435. The positive terminal pin feedthrough preferably comprises titanium although molybdenum, aluminum, nickel alloy, or stainless steel can also be used. The cell header is typically of a material similar to that of the case. The positive terminal pin supported in the glass-to-metal seal is, in turn, supported by the header, which is welded to the case containing the electrode stack. The cell is thereafter filled with the electrolyte solution described hereinabove and hermetically sealed such as by close-welding a stainless steel ball over the fill hole, but not limited thereto.

The following examples describe the manner and process of an electrochemical cell according to the present invention, and they set forth the best mode contemplated by the inventors of carrying out the invention, but they are not to be construed as limiting.

EXAMPLE

A mixture of 92.0 grams of graphite and 8.0 grams of polyvinylidene fluroide binder in N-methyl pyrrolidinone was mixed to provide a slurry. The slurry was horizontally coated onto a copper foil containing 5% openings by the knife-over-roll method. The openings were 0.002" in diameter. A piece of foil without openings was placed under the perforated foil being coated and both foils were passed through a drying oven set to 245° C. The electrodes obtained were cut to cell size, compacted and folded such that the uncoated side of the foil was back-to-back.

A mixture of 91.0 grams of $LiCoO_2$, 3.0 grams of polyvinylidene fluoride, and 6.0 grams of graphite was mixed with N-methyl pyrrolidinone to provide a slurry. The slurry was coated onto an aluminum foil containing 5% openings by the knife-over-roll method. The openings were 0.002" in diameter. A piece of foil without openings was placed under the foil being coated and both foils were passed through a drying oven set to 245° C. The foil was then flipped over and coated on the reverse side. It was not necessary to have a second piece of foil under the coated foil when coating the second side. The electrodes obtained were cut to cell size and compacted.

Figure 5:
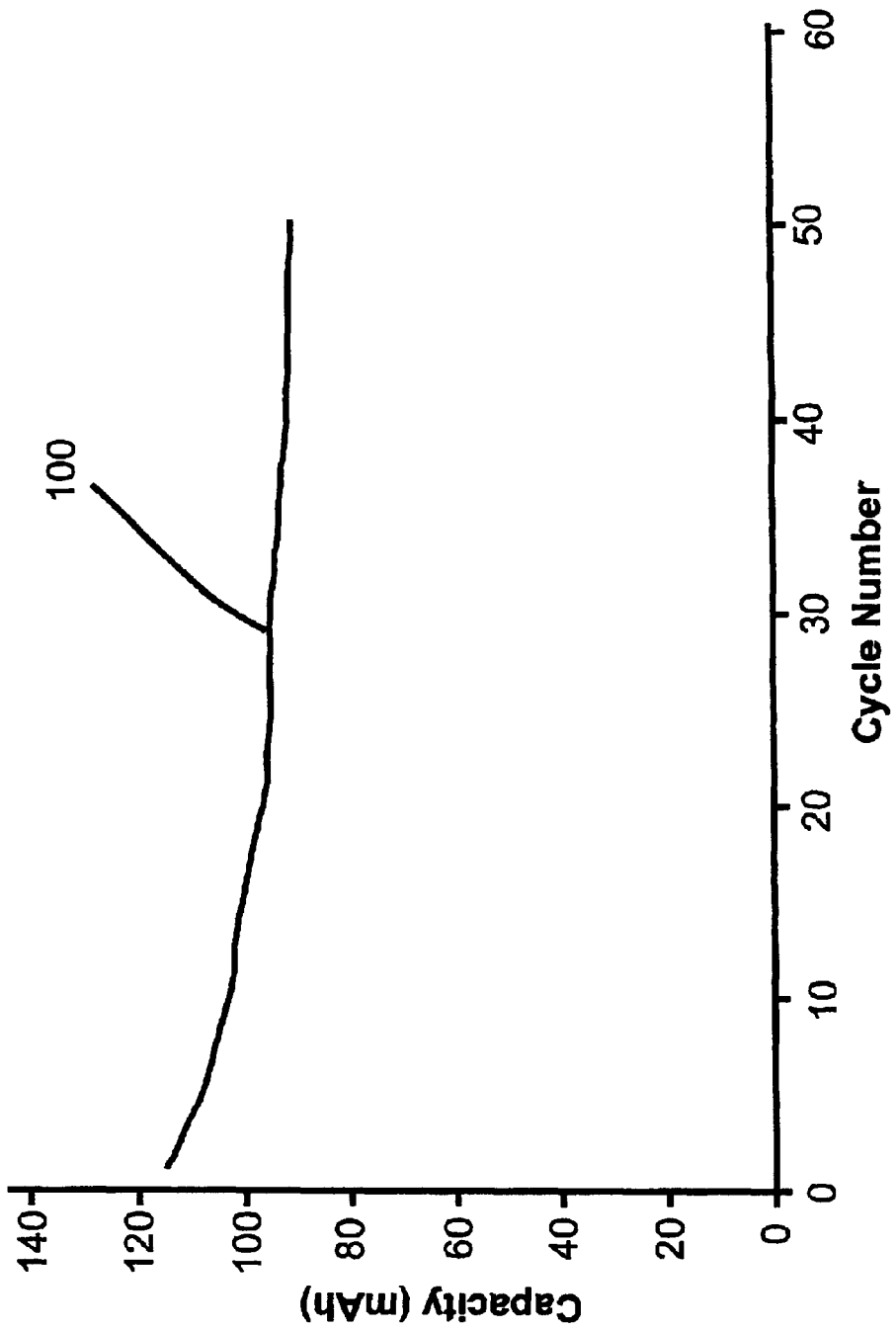
FIG. 5 is a graph constructed from the cycling discharge of a secondary cell built according to the present invention.

The two electrodes were wound around a flat 0.7 inch mandrel with a polypropylene separator. The cell stacks obtained were placed in a stainless steel case and activated with an electrolyte consisting of 1.4 M $LiPF_6$ in a mixture of ethylene carbonate, dimethyl carbonate, ethyl methyl carbonate, and diethyl carbonate. The cells were then cycle charged and discharged between 4.10 V and 2.75 V under a C/5 charge and a 1 C discharge rate. The results are graphed in FIG. 5 as curve 100.

It is intended that the foregoing description and example only be illustrative of the present invention and that the present invention is limited only by the following appended claims.

What is claimed is:

1. An electrochemical cell, which comprises:
   a) a negative electrode;
   b) a positive electrode;
   c) an electrolyte activating the negative and the positive electrodes;
   d) wherein at least one of the negative electrode and the positive electrode comprises a first active material dispersed in a solvent to form a first admixture slurry characterized as having been contacted to at least a first side of a perforated current collector without moving through the perforations to the opposite, second side thereof, and then having the solvent volatilized; and
   e) wherein the at least one of the negative electrode and the positive electrode is characterized as having a second active material contacted to the second side of the perforated current collector after the first admixture slurry is contacted to the first side thereof.

2. The electrochemical cell of claim 1 wherein the perforations are about 2% to about 80% of the total surface area of the current collector.

3. The electrochemical cell of claim 1 wherein the current collector is a perforated foil.

4. The electrochemical cell of claim 1 wherein the second active material is contacted to the second side of the current collector in a form selected from the group consisting of a slurry, a powder, a pellet and a free standing sheet.

5. The electrochemical cell of claim 1 wherein the electrode is a cathode having a configuration of: silver vanadium oxide/current collector/fluorinated carbon.

6. The electrochemical cell of claim 1 wherein the solvent is selected from the group consisting of water, methyl ethyl ketone, cyclohexanone, isophoron, N-methyl-2-pyrrolidone, N,N-dimethylformamide, N,N-dimethylacetamide, toluene, and mixtures thereof.

7. The electrochemical cell of claim 1 as either a primary or a secondary cell.

8. The electrochemical cell of claim 1 wherein at least one of the first and the second active materials includes a binder material.

9. The electrochemical cell of claim 8 wherein the binder material is selected from the group consisting of polyethylene, polypropylene, polyimide, fluorinated ethylene, fluorinated propylene, polyvinylidene fluoride, polytetrafluoroethylene, natural rubbers, and mixtures thereof.

10. The electrochemical cell of claim 8 wherein the first active material is silver vanadium oxide and the binder material is a mixture of polyvinylidene fluoride and a polyimide.

11. The electrochemical cell of claim 10 wherein the ratio of the polyvinylidene fluoride to the polyimide is, by weight, about 20:80 to about 0.80:20.

12. The electrochemical cell of claim 1 wherein the at least one of the negative electrode and the positive electrode comprises the first active material and a binder material characterized as having been heated at a temperature of about 50° C. to about 360° C. to volatilize the solvent.

13. The electrochemical cell of claim 12 wherein the heating is for about 30 seconds to about 5 hours.

14. The electrochemical cell of claim 1 wherein the cell is a lithium ion cell having the positive electrode comprised of a lithiated material and wherein the negative electrode is comprised of a carbonaceous material.

15. The electrochemical cell of claim 14 wherein the lithiated material is selected from the group consisting of $LiNiO_2$, $LiMn_2O_4$, $LiCoO_2$, $LiCo_{0.92}Sn_{0.08}O_2$ and $LiCo_{1-x}Ni_xO_2$.

16. The electrochemical cell of claim 1 wherein each of the first and the second active materials is contacted to the perforated current collector to a thickness of about 0.001 inches to about 0.05 inches.

17. An electrode for an electrochemical cell, the electrode comprising:
 a) a first active material;
 b) a first binder;
 c) a solvent into which the first active material and the first binder are dispersed to form a first admixture slurry characterized as having been contacted to a first side of a perforated current collector without moving through the perforations to an opposite, second side thereof, and then having the solvent volatilized; and
 d) a second active material contacted to the second side of the perforated current collector after the first admixture slurry is contacted to the first side thereof.

18. The electrode of claim 17 wherein the second active material is contacted to the second side of the current collector in a form selected from the group consisting of a slurry, a powder, a pellet and a free standing sheet.

19. The electrode of claim 17 wherein the electrode is a cathode having a configuration of: silver vanadium oxide/current collector/fluorinated carbon.

20. The electrode of claim 17 wherein the solvent is selected from the group consisting of water, methyl ethyl ketone, cyclohexanone, isophoron, N-methyl-2-pyrrolidone, N,N-dimethylformamide, N,N-dimethylacetamide, toluene, and mixtures thereof.

21. The electrode of claim 17 wherein the first active material is silver vanadium oxide and the binder material is a mixture of polyvinylidene fluoride and a polyimide.

22. The electrode of claim 21 wherein the ratio of the polyvinylidene fluoride to the polyimide is, by weight, about 20:80 to about 80:20.

23. The electrode of claim 17 wherein the at least one of the negative electrode and the positive electrode comprises the first active material and a binder material characterized as having been heated at a temperature of about 50° C. to about 360° C. to volatilize the solvent.

24. The electrode of claim 17 characterized as having been heated at a temperature of about 50° C. to about 360° C. for about 30 seconds to about 5 hours.

25. A method for providing an electrochemical cell, comprising the steps of:
 a) providing a negative electrode and a positive electrode in electrical association with each other;
 b) providing at least one of the negative electrode and the positive electrode of an electrode active material dispersed in a solvent to form a first active slurry;
 c) contacting the electrode active slurry to a first side of a perforated conductive substrate to form an electrode structure without having the slurry move through the perforations to an opposite, second side thereof; and
 d) volatilizing the solvent from the slurry.

26. The method of claim 25 including providing the perforations being about 2% to about 80% of the total surface area of the current collector.

27. The method of claim 25 including providing the current collector as a perforated foil.

28. The method of claim 25 including providing a second electrode active material and contacting it to the second side of the perforated conductive substrate after volatilizing the solvent from the first active slurry contacted to the first side.

29. The method of claim 28 including providing the second electrode active material in a form selected from the group consisting of a slurry, a powder, a pellet and a free standing sheet contacting the second side of the current collector.

30. The method of claim 25 including providing the cell of either a primary or a secondary chemistry.

31. The method of claim 25 including providing the electrode as a cathode having a configuration of: silver vanadium oxide/current collector/fluorinated carbon.

32. The method of claim 25 including selecting the solvent from the group consisting of water, methyl ethyl ketone, cyclohexanone, isophoron, N-methyl-2-pyrrolidone, N,N-dimethylformamide, N,N-dimethylacetamide, toluene, and mixtures thereof.

33. The method of claim 25 including providing the electrode as a cathode iii an alkali metal electrochemical cell or a cathode current collector in a cell containing a liquid depolarizer/catholyte.

34. The method of claim 25 including providing the electrode as either a negative or a positive electrode in a secondary electrochemical cell.

35. The method of claim 28 including providing at least one of the first and the second electrode active materials mixed with a binder selected from the group consisting of polyethylene, polypropylene, polyimide, fluorinated ethylene, fluorinated propylene, polyvinylidene fluoride, polytetrafluoroethylene, natural rubbers, and mixtures thereof.

36. The method of claim 35 including providing the electrode active material as silver vanadium oxide and the binder material as a mixture of poly-vinylidene fluoride and a polyimide.

37. The method of claim 36 wherein the ratio of the polyvinylidene fluoride to the polyimide is, by weight, about 20:80 to about 80:20.

38. The method of claim 25 including heating the electrode structure at a temperature of about 50° C. to about 360° C. for a period of about 30 seconds to about 5 hours to volatilize the solvent.

39. The method of claim 25 including contacting the first active slurry to the first side of the perforated conductive substrate while a barrier devoid of perforations is contacted to a second side of the conductive substrate.

40. The method of claim 25 including providing the first active slurry of a viscosity which is sufficient to prevent the slurry from moving through the perforations to the second side of the conductive substrate.

41. The method of claim 25 including incorporating the electrode into a lithium ion cell having a positive electrode devoid of lithium material and a negative electrode comprised of a carbonaceous material.

42. The method of claim 25 including selecting the electrode active material from the group consisting of silver vanadium oxide, copper silver vanadium oxide, manganese dioxide, copper vanadium oxide, titanium disulfide, copper oxide, copper sulfide, iron sulfide, iron disulfide, fluorinated carbon, and mixtures thereof.

43. The method of claim 25 including selecting the conductive substrate from the group consisting of titanium, aluminum, nickel, stainless steel, cobalt, copper, and alloys thereof.

44. The method of claim 28 including contacting each of the first and second active materials to the conductive substrate to a thickness of about 0.01 inches to about 0.05 inches.

45. An electrochemical cell, which comprises:
a) a negative electrode;
b) a positive electrode; and
c) an electrolyte activating the negative and the positive electrodes, wherein at least one of the negative and positive electrodes comprises a first active material mixed with a binder material and dispersed in a solvent to form a first admixture slurry characterized as having been contacted to at least a first side of a perforated current collector without moving through the perforations to the opposite, second side thereof, and then having the solvent volatilized.

46. The electrochemical cell of claim 45 wherein a second active material is characterized as having been contacted to the second side of the perforated current collector after the first admixture slurry is contacted to the first side thereof.

47. A lithium ion electrochemical cell, which comprises:
a) a negative electrode comprised of a carbonaceous material;
b) a positive electrode comprised of a lithiated material; and
c) an electrolyte activating the negative and the positive electrodes, wherein at least one of the carbonaceous material and the lithiated material of the respective negative and positive electrodes is characterized as having been dispersed in a solvent to form a first admixture slurry contacted to at least a first side of a perforated current collector without moving through the perforations to the opposite, second side thereof, and then having the solvent volatilized.

48. An electrode for an electrochemical cell, the electrode comprising:
a) an active material comprising silver vanadium oxide;
b) a binder mixture of polyvinylidene fluoride and a polyimide; and
c) a solvent into which the first active material and binder mixture are dispersed to form a first admixture slurry characterized as having been contacted to a first side of a perforated current collector without moving through the perforations to an opposite, second side thereof, and then having the solvent volatilized.

49. The electrode of claim 48 wherein a second active material is characterized as having been contacted to the second side of the perforated current collector after the first admixture slurry is contacted to the first side thereof.

* * * * *

UNITED STATES PATENT AND TRADEMARK OFFICE
CERTIFICATE OF CORRECTION

PATENT NO. : 6,790,561 B2
DATED : September 14, 2004
INVENTOR(S) : Hong Gan et al.

It is certified that error appears in the above-identified patent and that said Letters Patent is hereby corrected as shown below:

Column 11,
Line 7, "about 0.80:20" should read -- about 80:20 --;

Column 12,
Line 36, "cathode iii an" should read -- cathode in an --; and
Line 51, "poly-vinylidene" should read -- polyvinylidene --.

Signed and Sealed this

Fifth Day of April, 2005

JON W. DUDAS
*Director of the United States Patent and Trademark Office*